April 24, 1945. C. C. FULTON 2,374,533
ATTACHABLE POWER DRIVEN SUPPORTING FRAME FOR MOWERS
AND OTHER GARDEN IMPLEMENTS
Filed June 22, 1942 2 Sheets-Sheet 2

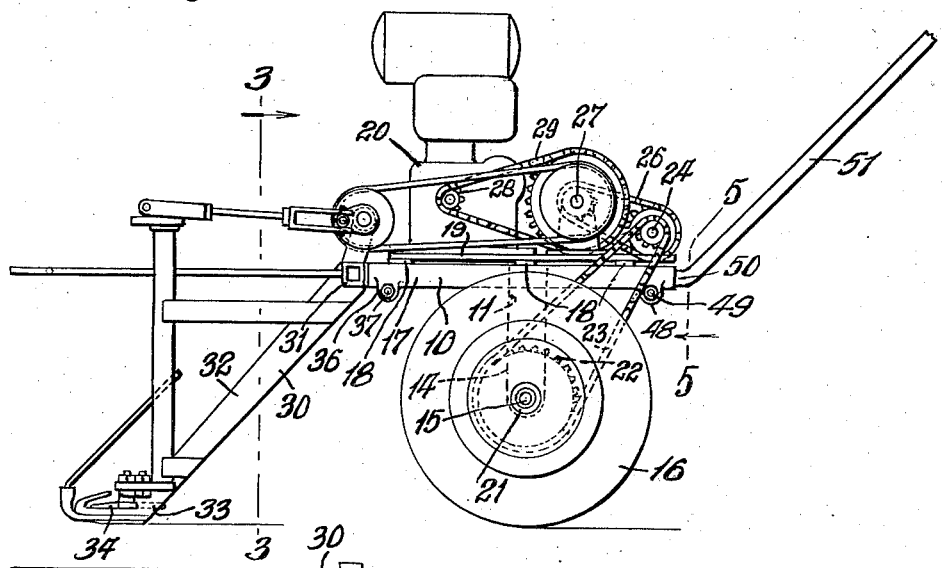
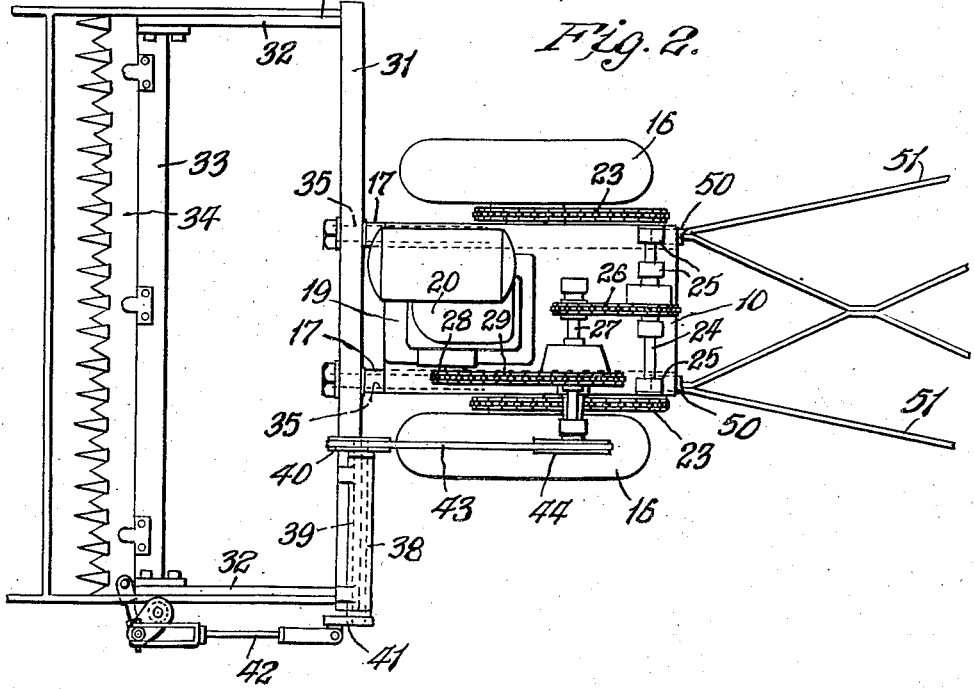

Inventor:
Claude C. Fulton
By Herbert G. Fletcher
atty.

Patented Apr. 24, 1945

2,374,533

UNITED STATES PATENT OFFICE 2,374,533

ATTACHABLE POWER-DRIVEN SUPPORTING FRAME FOR MOWERS AND OTHER GARDEN IMPLEMENTS

Claude C. Fulton, St. Louis, Mo.

Application June 22, 1942, Serial No. 447,976

2 Claims. (Cl. 180—19)

This invention relates to an attachable power driven supporting frame for mowers and other garden working implements, and in fact goes to the frame structure of a propelling device on which an internal combustion engine is mounted for driving or propelling the device, and the device or frame structure thereof being of a construction whereby it may be readily attached or detached to different required garden working implements having cooperable means for adaptably attaching or detaching, and so that the attached implement may be operated or propelled.

It is therefore an object of the invention to provide a frame for supporting a power generating unit and the frame being of a construction to provide for aptly and quickly attaching and detaching the different implements thereto as may be required.

Another object of the invention is to provide the frame of a partly tubular construction for use in clampingly securing the attached implement.

A further object is to provide a propelling frame with means for telescopingly attaching cooperation with parts of the implement to be attached.

A still further object is to provide a frame with improved cooperable means for attaching the guiding handles thereto.

Still another object is to provide a propelling frame having an arched ground wheel support with paralleling tubular members for providing attaching means for parts to be secured to the frame.

With the foregoing and other objects in view which will appear as the description proceeds, my invention resides in the combination and arrangement of parts and in the details of construction hereinafter described and claimed, it being understood that changes may be made within the scope of what is claimed without departing from the spirit of the invention.

Embodiments of the invention are illustrated in the accompanying drawings, wherein—

Figure 1 is a side elevation of this improved power driven supporting frame showing it attached to a power sickle mower.

Figure 2 is a plan elevation of Fig. 1.

Figure 3:
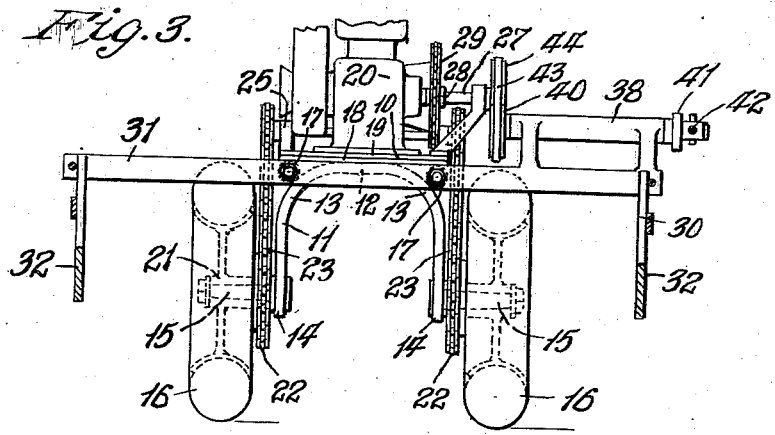
Figure 3 is a vertical traverse sectional elevation taken approximately on the line 3—3 of Fig. 1.
Figure 4:
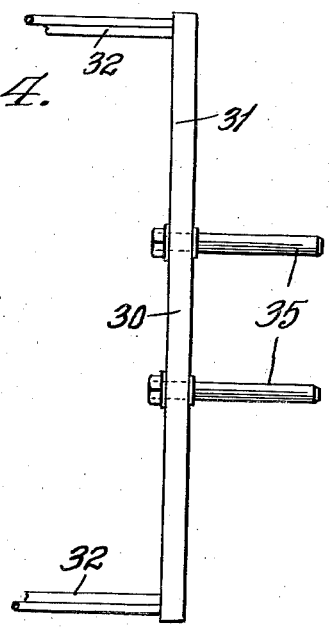
Figure 4 is a fragmentary plan view of a portion of the mower frame showing the attaching prongs thereof for cooperation with the power driven supporting frame.
Figure 5:
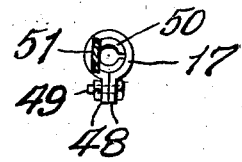
Figure 5 is an enlarged fragmentary transverse vertical section elevation taken approximately on the line 5—5 of Fig. 1, showing the manner of attaching the guiding handles to the supporting frame.

Referring by numerals to the accompanying drawings, 10 designates this improved attachable power driven supporting frame which comprises an arched member 11 having a horizontal portion 12 which is downwardly bent at its ends as designated at 13 to form depending legs 14. The arched member 11 may be formed from strap iron and at the lower end of each leg 14a horizontal spindle 15 is outwardly projected, and turnably mounted on each spindle is a ground wheel 16.

Fixed by welding or other suitable means on the shoulder on each bend 13 of the arched member 11 is a horizontally disposed tubular member 17, and mounted on said members 17 and secured thereto are a series of transversely disposed bars 18 for the support of a platform 19, and mounted on said platform is an internal combustion engine 20.

On the inner end of the hub 21 of each ground wheel 16 is a fixed sprocket 22, said sprockets being driven by respective chain-belts 23 from differential shafting 24 supported in bearings 25 from the platform 19. The shafting 24 is driven by the chain-belt 26 on the clutch shaft 27 which receives its rotation from the engine sprocket 28 by the chain-belt 29.

Figs. 1 and 2 show the attachment of a sickle mower frame 30 to the power driven supporting frame 10, said frame 30 comprising a horizontally disposed transverse tubular bar 31 having downwardly and forwardly extending arms 32 for the support of the blade holder 33 of the sickle blade 34.

Intermediate the length of the bar 31 are a pair of rearwardly extending parallelly disposed prongs 35 which are spaced apart equal to the distance of that of the tubular members 17 of the supporting frame 10 and are inserted in the forward ends of respective members 17. Each member 17 is provided on its underside adjacent their forward ends with a longitudinal split and with depending ears 36 on each side of the split through which respective clamping bolts 37 are secured and after insertion of the prongs 35 the bolts 37 are manipulated to clampingly secure the prongs of the mower frame 30 in respective tubular members 17.

The bar 31 of the mower frame 30 adjacent one end is provided with a horizontally disposed bearing 38 for the support of a shaft 39 having a grooved pulley 40 on one end and a crank arm 41 secured to the opposite end of said shaft and connected to said arm is a rod 42 which is connected at its opposite end to reciprocatory mechanism such as shown in my U. S. Letters Patent No. 2,263,083, dated November 18, 1941, for operating the sickle blade 34 of the blade holder 33.

When the mower frame 30 is attached for mowing purposes a belt 43 is cooperably engaged on the pulley 40 and the pulley 44 on the clutch shaft 27 so that the sickle blade 34 can be reciprocated by power from the engine 20 as the supporting frame 10 is propelled by the traction or ground wheels 16 of the supporting frame 10.

Obviously, other implements if provided with insertable prongs such as those shown at 35, can be attached to the power propelling frame 10.

The rear ends of the tubular members 17 of the supporting frame 10 are also longitudinally split on their under sides and are provided with depending ears 48 and a clamping bolt 49 is secured in each pair of ears so that the stub end 50 of each of the handle-bars 51 can be engaged and secured in the rear ends of respective tubular members 17.

The arched member 11 having the legs 14 from which the ground wheel supporting spindles are extended not only provides for the straddling of cut growth for eliminating entanglements, but also provides for a simple construction of supporting frame in that the arched member forms an ideal base structure for the securing of the superstructure which is comprised of the paralleling tubular members 17, transverse bars 18 and platform 19 for the support of the power unit or engine 20.

The tubular members 17 as shown are each fixed on a respective shoulder or bend 13 of the arched member 11 with their top edges flush and on the same horizontal plane with the top of the horizontal portion 12 of the arched member and which specific construction lends itself for flush securance of an intermediate transverse bar 18 as clearly shown in Fig. 3.

What I claim is:

1. The combination of a frame having a traction wheel, power means cooperable with said wheel, a pair of handle bars, and an implement to be attached to said frame, said frame having a pair of spaced open ended paralleling tubular members each being longitudinally split at their open ends, said implement having a pair of extending prongs for insertable cooperation with said tubular members at one end thereof, said handle bars having insertable cooperation with the other ends of said tubular members, and clamping means at the split ends of said tubular members.

2. The combination of a power driven frame and an implement to be attached to the frame, said frame comprising an arched member having a pair of depending legs, a spindle extending from each of said legs, a traction wheel on each of said spindles, a tubular member horizontally disposed and secured at right angles to said arched member on each shoulder formed by the arch thereof, each of said tubular members having adjacent split open ends, said implement having a pair of extending prongs for insertable cooperation with said tubular members, clamping means at the split open ends of said tubular members, and power means supported by said tubular members and having driving cooperation with said wheels.

CLAUDE C. FULTON.